Figure 1:
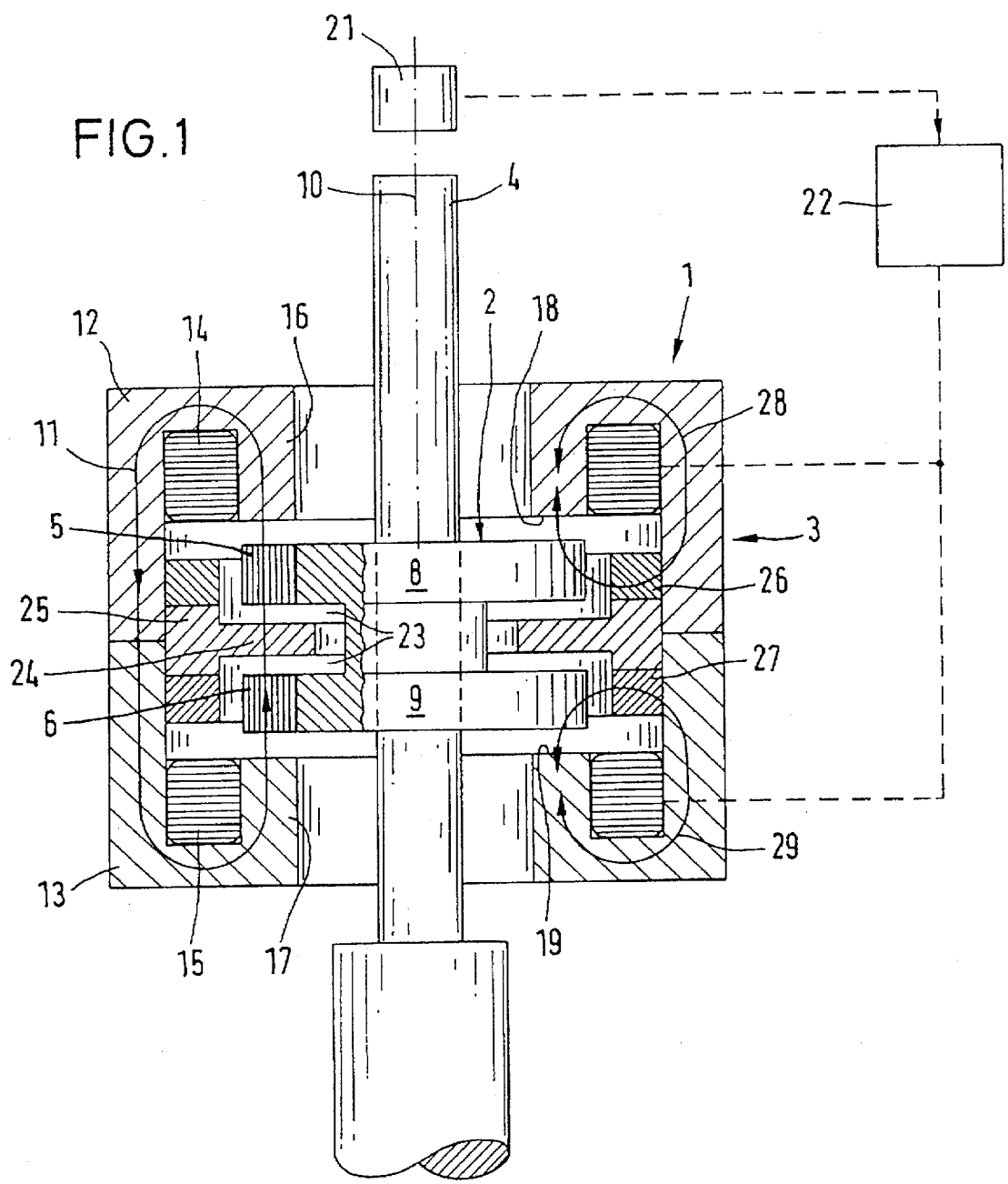

United States Patent
Fremery et al.

[11] Patent Number: 5,729,065
[45] Date of Patent: Mar. 17, 1998

[54] MAGNETIC BEARING CELL WITH ROTOR AND STATOR

[75] Inventors: Johan K. Fremery, Bonn; Helmut Schneider, Zulpich; Peter Reimer, Hurth; Josef Hodapp, Euskirchen, all of Germany

[73] Assignee: Leybold Aktiengesellschaft, Germany

[21] Appl. No.: 491,987

[22] PCT Filed: Dec. 15, 1993

[86] PCT No.: PCT/EP93/03540

§ 371 Date: Sep. 13, 1995

§ 102(e) Date: Sep. 13, 1995

[87] PCT Pub. No.: WO94/16235

PCT Pub. Date: Jul. 21, 1994

[30] Foreign Application Priority Data

Jan. 16, 1993 [DE] Germany .................. 43 01 076.8

[51] Int. Cl.[6] .................................................. H02K 7/09
[52] U.S. Cl. .................. 310/90.5; 310/156; 310/261; 310/268; 310/254
[58] Field of Search ................ 310/90.5, 90, 156, 310/261, 268, 254

[56] References Cited

U.S. PATENT DOCUMENTS

| | | | |
|---|---|---|---|
| 4,620,752 | 11/1986 | Fremerey et al. | 310/90.5 |
| 5,084,644 | 1/1992 | Harris et al. | 310/90.5 |
| 5,250,865 | 10/1993 | Meeks | 310/90.5 |
| 5,315,197 | 5/1994 | Meeks et al. | 310/90.5 |
| 5,386,166 | 1/1995 | Reimer et al. | 310/90.5 |
| 5,514,924 | 5/1996 | McMullen et al. | 310/90.5 |

FOREIGN PATENT DOCUMENTS

| | | |
|---|---|---|
| 0332979 | 3/1989 | European Pat. Off. . |
| 0467341 | 7/1991 | European Pat. Off. . |
| 0155624 | 3/1995 | European Pat. Off. . |

Primary Examiner—Clayton E. LaBalle
Assistant Examiner—Elvin G. Enad
Attorney, Agent, or Firm—Wall Marjama & Bilinski

[57] ABSTRACT

The invention relates to a rotationally symmetrical[1] magnetic bearing cell (1) with a rotor (2) arranged to rotate about the central axis (10) of the cell (1) and having a shaft (4) and at least two axially magnetised permanent magnetic rings (5, 6, 30) fitted an axial distance apart on the shaft and with a stator (3) having pole components (12, 13, 16, 17) and two annular coils (14, 15) associated with the rotor end faces; to improve the radial rigidity without increasing active control complexity, it is proposed that pole components (26, 27, 38) of magnetically conductive material be provided for the peripheral regions of the two axially outer permanent magnet rings (5, 6 or 5, 30) to direct the magnetic flux generated by the annular coils (14, 15) into two substantially independent magnetic flux circuits (28, 29).

[1]Translator's: note The German text reads "aufgebautet". This is grammatically not correct. Instead the German text should read "aufgebaute". The latter has been assumed for the translation.

3 Claims, 2 Drawing Sheets

MAGNETIC BEARING CELL WITH ROTOR AND STATOR

MAGNETIC BEARING CELL WITH ROTOR AND STATOR

The invention relates to a rotationally symmetrical magnetic bearing cell with a rotor arranged to rotate about the central axis of the cell having a shaft and at least two axially magnetised permanent magnetic rings fitted an axial distance apart on the shaft, as well as a stator having pole components and two annular coils associated with the rotor end faces whereby the rotor and stator components are arranged in such a way with respect to each other that the permanent magnets generate a magnetic flux which surrounds the central axis toroidally embracing the annular coils.

A magnetic bearing cell having these characteristics is known from DE-C 34 09 047. Its rotor has two axially magnetised permanent magnetic rings which generate the magnetic flux toroidally about the central axis embracing the annular coils. The magnetic flux penetrates the permanent magnetic rings of the rotor which are axially arranged behind each other as well as the peripheral pole components so that a high radial rigidity is attained. The bearing is unstable in the axial direction and therefore requires an active control with respect to this direction. For this purpose annular coils are associated with each of the rotor end faces. Each of these annular coils also generates a toroidal magnetic flux which surrounds the central axis and which superimposes itself on the magnetic flux generated by the permanent magnetic rings. The active control is preferably selected in such a manner that the annular coils do not carry a current when the rotor has attained its nominal position. If the rotor deviates from its nominal position in the axial direction, then a current is applied to the annular coils. The magnitude of the current and its direction depend on the magnitude and the direction of the deviation. Depending on the direction of the current, the toroidal magnetic flux generated by the annular coils has the same or the opposite direction with respect to the magnetic flux produced by the permanent magnetic rings.

SUMMARY OF THE INVENTION

In order to improve radial rigidity of a magnetic bearing of the aforementioned kind, it is proposed to increase the number of permanent magnetic rings on the rotor and to provide in addition on the stator at least one additional permanent magnetic ring which is also axially magnetised (refer to DE-A 41 06 063). These measures increase the flux produced by the permanent magnets, i.e. increase the axial forces and thus give rise to the desired increase in radial rigidity. In order to be able to perform their control task, the annular coils must be capable of generating control fluxes which compensate the increased axial forces. The prerequisite for this is an increased cross section for the annular coils as well as increased complexity regarding current generation and active control for the coils.

It is the task of the present invention to design a magnetic bearing cell of the aforementioned kind in such a way, that in spite of an improvement in radial rigidity by increasing the number of permanent magnetic rings, active control complexity is not increased.

According to the present invention this task is solved by associating pole components of magnetically conductive material with the peripheral regions of the two axially outer permanent magnetic rings to direct the magnetic flux generated by the annular cells into two substantially independent magnetic flux circuits.

The proposed measures favour the formation of control fluxes directly associated with the annular coils. These cause the magnetic fluxes which are generated by the annular coils and which are substantially independent of each other to only penetrate the respective pole components surrounding the annular coils, a part of the permanent magnetic ring in the vicinity as well as the respective axial and peripheral slit between rotor and stator. Greater resistances are thus not present in these magnetic flux circuits. The magnetic fluxes which chiefly contribute to the axial control of the magnetic field need no longer penetrate the other still present components (permanent magnets, attenuation discs) and slits. Thus the complexity required for the annular coils with regard to size and power supply does thus no longer depend on the number of permanent magnetic rings present.

DESCRIPTION OF THE INVENTION

Figure 2:
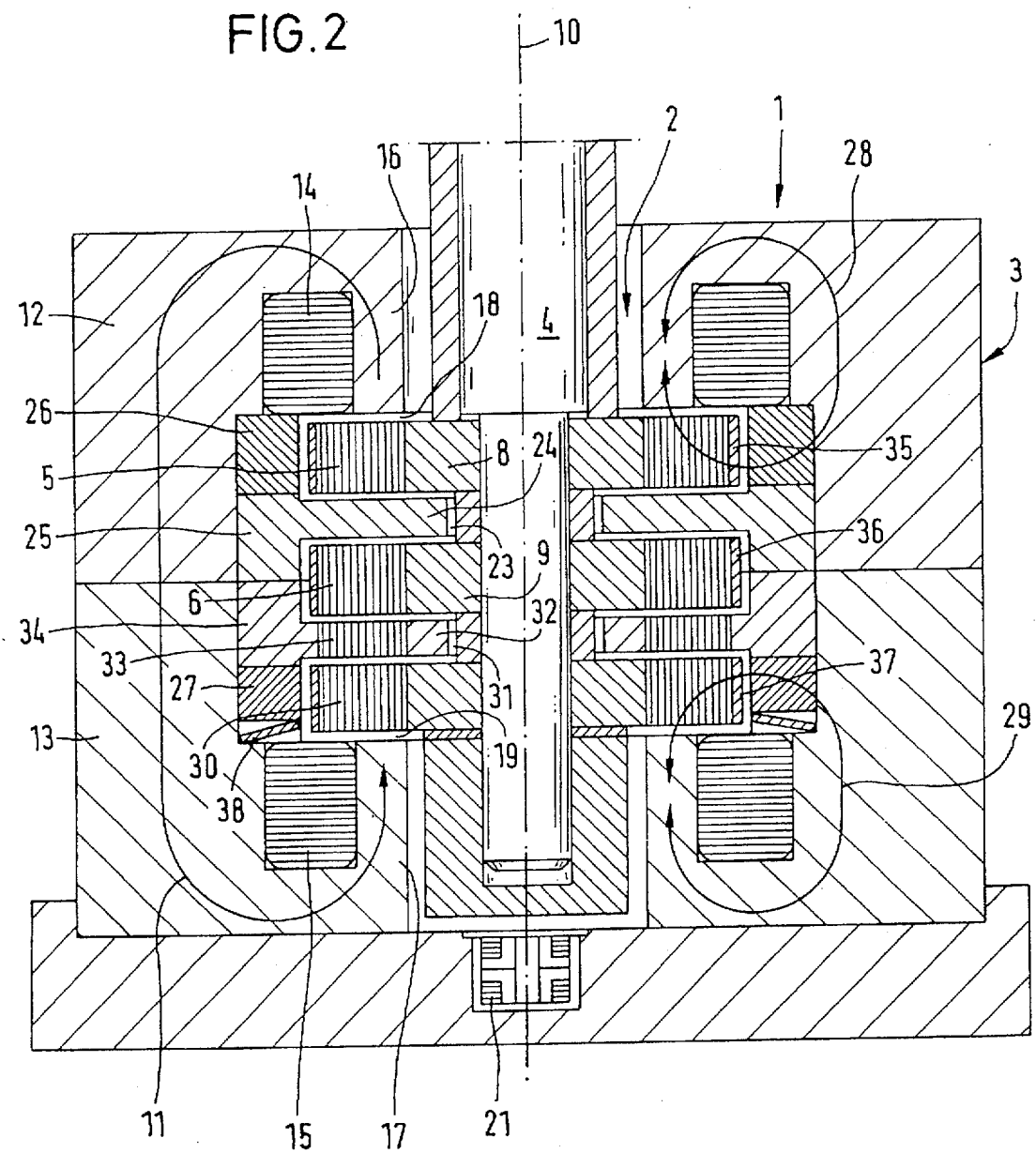

Further advantages and details of the present invention shall be explained by referring to the design examples of drawing FIGS. 1 and 2. Shown in drawing FIG. 1 is a magnetic bearing cell with two permanent magnetic rings and drawing FIG. 2 is a magnetic bearing cell with four permanent magnetic rings, The magnetic bearing cell 1 shown in the drawing figure embraces rotor 2 and stator 3.

Components of the rotor 2 are shaft 4 and the permanent magnetic rings 5 and 6 attached to shaft 4. Inner hub rings 8, 9 are provided for attachment of the permanent magnetic rings 5, 6 to shaft 4. The toroidal magnetic flux surrounding central axis 10 which is produced by the permanent magnetic rings 5, 6 is indicated by arrow 11.

Stator 3 embraces with respect to central axis 10 rotationally symmetrically designed pole components 12, 13, the common cross section of which is substantially C-shaped. Annular coils 14, 15 are located in face region C. The inner sections 16, 17 form pole surfaces 18, 19 which face the permanent magnetic rings 5, 6 of rotor 2. A sensor arrangement 21 as well as an electronic controller 22 which is shown as a block are provided to control the current flow through annular coils 14, 15.

Annular disc 24 which is made of non-magnetisable material of high electrical conductivity, like copper, for example, engages in slit 23 between the permanent magnetic rings 5 and 6. Annular disc 24 has a peripheral cylindrical section 25, which rests against the insides of components 12, 13. In the case of substantially axially directed relative movements, eddy currents are generated in the annular disc 24 and also in the cylindrical section 25, which produce the desired damping effect. The cylindrical section 25 has a centering function and moreover it promotes the removal of heat caused by the eddy currents.

Further stator components 26, 27 are associated with the peripheral regions of permanent magnetic rings 5, 6 which are formed as stator rings surrounding the permanent magnet rings 5, 6. They are made of a magnetically well conducting material and have the effect that annular coils 14, 15 generate—in contrast to magnetic flux circuit 11 produced by the permanent magnetic rings 5, 6—two magnetic flux circuits 28, 29.

In the design example according to drawing FIG. 2, three rotating and axially magnetised permanent magnetic rings 5, 6 and 30 are provided. The slit 31 between permanent magnetic rings 6 and 30 is engaged by an annular disc 32, which carries a further, resting permanent magnetic ring 33. The radial dimensions of this stator permanent magnetic ring 33 correspond to the dimensions of rotor permanent magnetic rings 6 and 30. Moreover, the disc 32 is made of non-magnetisable material (stainless steel, for example) and also has the peripheral cylindrical section 34, which rests against the inside of component 13 for the purpose of centering. If, in addition, the material has a high electrical conductance, then it will contribute to an improvement of the damping characteristics.

Magnet rings 5, 6, 30, 33 are magnetised in the axial direction in such a way that attracting forces act between them. Together with pole components 12, 13, 16, 17, they form a magnetic circuit (arrow 11) which is responsible for the radial rigidity. Outer reinforcement rings 35, 36, 37 embrace the rotating permanent magnetic rings and protect these against being damaged by the influence of the relatively high centrifugal forces during the rotation.

The outer permanent magnetic rings 5 and 30 are associated at their peripheral regions with stator rings 26, 27 which cause the desired splitting of the magnetic field generated by annular coils 14, 15 into two separate magnetic fluxes (arrows 28, 29). If in the areas of the stator rings 28, 29, Belleville spring washers 38 or packs of Belleville spring washers are necessary for mutual tensioning of the various ring components 25, 26, 27, 34, then it is expedient to provide Belleville spring washers made of a magnetically well conducting material. These may replace a stator ring 28 or 29, or may be additionally present.

We claim:

1. A rotationally symmetrical magnetic bearing cell (1) comprising:

a rotor (2) arranged to rotate about a central axis (10) of the cell (1) and having a shaft (4) and at least two axially magnetised permanent magnetic rings (5, 6, 30) fitted an axial distance apart on the shaft, as well as a stator (3), which has a first plurality of pole components (12, 13, 16, 17) and two annular coils (14, 15) which are associated with a respective rotor end face, whereby the rotor and stator are arranged with respect to each other in such a manner that the permanent magnetic rings (5, 6, 30) produce a magnetic flux (11) which toroidally surrounds the central axis (10) and embraces the annular coils (14, 15)

wherein a second plurality of pole components (26, 27, 38) made of a magnetically well conducting material are associated with respective peripheral regions of each of the two axially outer permanent magnetic rings (5, 6 or 5, 30), whereby said second plurality of pole components direct a magnetic flux generated by the annular coils (14, 15) into two substantially independent magnetic flux circuits (28, 29).

2. Magnetic bearing cell according to claim 1, wherein the permanent magnetic rings (5, 6, or 5, 30) are directly surrounded by stator rings (26, 27).

3. Magnetic bearing cell according to claim 1, wherein in addition to, or instead of one stator ring (26, 27), one or several Belleville spring washers (38) made of a magnetically well conducting material are present.

* * * * *

UNITED STATES PATENT AND TRADEMARK OFFICE
CERTIFICATE OF CORRECTION

PATENT NO : 5,729,065
DATED : March 17, 1998
INVENTOR(S) : Johan K. Fremery, Helmut Schneider, Peter Reimer, and Josef Hodapp It is certified that error appears in the above-identified patent and that said Letters Patent is hereby corrected as shown below:

On the title page: Item [73] Assignee:

In the Assignee Field please add second assignee

--FORSCHUNGESENTRUM JULICH, GMBH

FED REP GERMANY--

Signed and Sealed this

Tenth Day of November 1998

*Attest:*

BRUCE LEHMAN

*Attesting Officer*  *Commissioner of Patents and Trademarks*